(No Model.)
O. R. PIHL.
HANDLE BAR FOR BICYCLES.
No. 599,793. Patented Mar. 1, 1898.
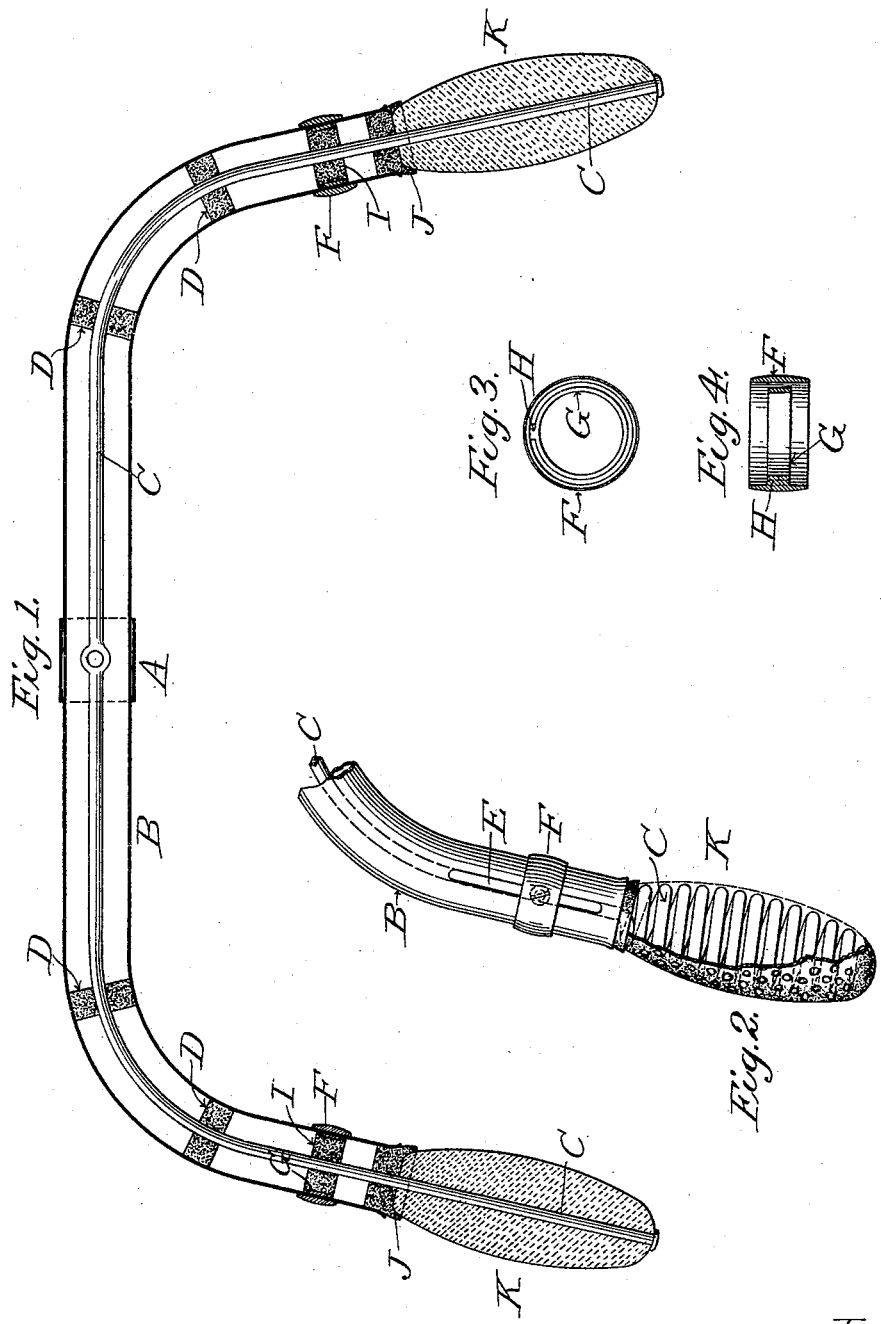
Attest
C. C. Burdine.
J. M. Pond.
Inventor:
Olaf R. Pihl,
by Dodge and Sons,
Attys.

UNITED STATES PATENT OFFICE.

OLAF R. PIHL, OF PORTLAND, OREGON.

HANDLE-BAR FOR BICYCLES.

SPECIFICATION forming part of Letters Patent No. 599,793, dated March 1, 1898.

Application filed December 1, 1896. Serial No. 614,064. (No model.)

*To all whom it may concern:*

Be it known that I, OLAF R. PIHL, a citizen of the United States, residing at Portland, in the county of Multnomah and State of Oregon, have invented certain new and useful Improvements in Handle-Bars for Bicycles and Like Vehicles, of which the following is a specification.

My present invention pertains to the construction of handle-bars for bicycles and like vehicles, the advantages of which will be hereinafter set forth, reference being had to the accompanying drawings, in which—

Figure 1 is a horizontal sectional view of my improved handle-bar; Fig. 2, a plan view showing a portion of the handle-bar as viewed from the under side, and Figs. 3 and 4 views illustrating the construction of the adjusting ring or device.

The object of my invention is to so construct a handle-bar that it will absorb the vibrations imparted to it as the bicycle passes over an obstruction or any unevenness in the roadway without transmitting such movements or jar to the hands of the rider to any appreciable extent.

Under the construction of the handle-bar as designed by me the rigidity of the structure necessary to a proper steering of the bicycle is maintained, while the object just set forth is also obtained.

Referring to the drawings, A denotes the head of the usual upright post or standard of the handle-bar, which is fastened or clamped to the upper end of the steering-head, and B a tube, of steel or like material, permanently secured thereto, forming the body of the handle-bar. Extending throughout the length of the tube B is a steel rod C, securely fastened in the head A against lateral and endwise movement, or the rod may comprise two sections united and securely fastened in the head A and extending therefrom to the ends of the tube B.

At intervals in the tube B, intermediate the head A and the end, I secure upon the rod washers D, formed of soft rubber. These washers are of a diameter equal to the internal diameter of the tube and are formed with a central opening, through which the rod passes. They may be fixed to the rod and tube in any suitable manner. Near each end of the tube a slot E is formed, and a ring or collar F (shown in detail in Figs. 3 and 4) is mounted on the tube at this point. This collar or ring comprises an outer section and a reduced inner ring G, connected together by a screw or rivet or made integral, as shown in the drawings, forming a neck H. The inner bearing-face of the outer member of the collar may be lined with some soft material—such, for instance, as chamois—to prevent wear or abrasion of the collar upon the tube. When the collar is in position, the neck H works in the slot E, while the inner ring G fits closely against the interior face of tube B.

I designates a washer, of soft rubber, formed with an annular seat or depression, in which is seated the ring G, and it is further provided with a central opening through which rod C is passed. The collar F and the washer I, while fitting closely against the tube and rod, are independent thereof and may be moved back and forth, limited only by the length of slot E.

Each end of the tube is flared slightly outward, and seated therein is a socket-piece or bushing J, formed of sponge-rubber or other similar elastic and yielding material. The rod C passes through this bushing and extends beyond the same such a distance as to permit the securing of a grip or handpiece K upon the end thereof. This grip may be of any approved style, and in Fig. 2 I have shown it as being formed by coiling the end of the rod into the desired shape and afterward covering it with perforated rubber, thereby forming a ventilated handle or grip.

In use the rider moves the collars H toward or from the grip, thus giving that portion of the rod intermediate the washer I and the bushing J more or less length, and consequently the grip or handle greater or less latitude of movement, by reason of the point of support of the rod being closer or farther away from the bushing and grip. The action of the device may be thus varied according to the adjustment of the collar and the washer I.

When the bicycle encounters an obstruction, the head A is thrown forward, and while the rider retains his hold upon the handle the elastic washers will be slightly compressed, and if the strain be to one side of the head one handle will slightly compress its bushing, while the other handle will be slightly withdrawn.

Under any jar or strain that may be exerted the construction above set forth will absorb the shock, and that tremor or vibration which is attendant in rigid handle-bars is done away with, while the facility for steering is not interfered with or lessened in the least.

Having thus described my invention, what I claim is—

1. In a handle-bar, the combination of the tube; a flexible rod mounted therein; grips secured to the ends of said rod; and a series of elastic washers spaced upon the rod within the tube at different points throughout its length.

2. In a handle-bar, the combination of the tube; a flexible rod mounted therein; grips secured to the ends of said rod; and movable elastic supports for said rod.

3. In a handle-bar, the combination of the tube; a flexible rod mounted therein; grips secured to the ends of said rod; fixed elastic supports for said rod; and movable elastic supports for the rod near the end of the tube.

4. In a handle-bar, the combination of the tube; a flexible rod mounted therein; fixed elastic supports for the rod within the tube; movable elastic supports for the rod near the ends of the tube; yielding sockets mounted upon the rod and in the end of the tube; and grips secured upon the ends of the rod.

5. In combination with the tube A provided with slots E; rod C elastically mounted within said tube; collar F and ring G; and elastic washer I, substantially as and for the purpose described.

In witness whereof I hereunto set my hand in the presence of two witnesses.

OLAF R. PIHL.

Witnesses:
D. W. STEVENS,
E. C. COMSTOCK.